(12) United States Patent
Bernstein et al.

(10) Patent No.: US 9,270,597 B2
(45) Date of Patent: Feb. 23, 2016

(54) REPRESENTING BANDWIDTH CONSTRAINTS IN PARTIALLY CONTROLLED ENVIRONMENTS

(71) Applicant: Futurewei Technologies, Inc., Plano, TX (US)

(72) Inventors: Greg Bernstein, Fremont, CA (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 113 days.

(21) Appl. No.: 13/937,942

(22) Filed: Jul. 9, 2013

(65) Prior Publication Data

US 2014/0016467 A1    Jan. 16, 2014

Related U.S. Application Data

(60) Provisional application No. 61/669,991, filed on Jul. 10, 2012.

(51) Int. Cl.
*H04L 12/801* (2013.01)
*H04L 12/721* (2013.01)

(52) U.S. Cl.
CPC .............. *H04L 47/10* (2013.01); *H04L 45/124* (2013.01)

(58) Field of Classification Search
None
See application file for complete search history.

(56) References Cited

U.S. PATENT DOCUMENTS

| | | | |
|---|---|---|---|
| 7,801,048 B1 * | 9/2010 | Sivabalan et al. | 370/238 |
| 8,223,651 B2 * | 7/2012 | Kano | 370/238 |
| 8,767,729 B2 * | 7/2014 | Lee | 370/389 |
| 8,885,463 B1 * | 11/2014 | Medved et al. | 370/228 |
| 2005/0152284 A1 * | 7/2005 | Kotha et al. | 370/254 |
| 2007/0217419 A1 * | 9/2007 | Vasseur | 370/392 |
| 2011/0242995 A1 * | 10/2011 | Zhang et al. | 370/252 |
| 2011/0243030 A1 * | 10/2011 | Zhang et al. | 370/254 |
| 2011/0292832 A1 * | 12/2011 | Bottari et al. | 370/254 |
| 2012/0076046 A1 * | 3/2012 | Lin | 370/254 |
| 2012/0163390 A1 * | 6/2012 | Iovanna et al. | 370/400 |
| 2012/0163797 A1 * | 6/2012 | Wang | 398/2 |

(Continued)

FOREIGN PATENT DOCUMENTS

WO     WO 2011/103913 A1 *    9/2011    ............ H04L 12/24

OTHER PUBLICATIONS

"Use Case 2b: Service Provider Data Center Interconnection (DCI), Optical Transport WG", Open Networking Foundation, 2013, 16 pages.

(Continued)

*Primary Examiner* — Chirag Shah
*Assistant Examiner* — Suk Jin Kang
(74) *Attorney, Agent, or Firm* — Conley Rose, P.C.; Grant Rodolph; Brandt D. Howell

(57) ABSTRACT

Disclosed is a network element (NE) comprising a receiver configured to receive a path computation request, a path computation element (PCE) coupled to the receiver and configured to compute a group of network paths through a network of NEs operating in a network stratum in response to the path computation request, wherein each network path comprises one or more physical links, and compute at least one constraint for each physical link, and an abstraction module coupled to the PCE and configured to receive the computed network path set and constraints, compute one or more abstract links that describe the network path group, and compute a constraint for each abstract link based on the physical link constraints.

19 Claims, 14 Drawing Sheets

(56) References Cited

U.S. PATENT DOCUMENTS

| | | | |
|---|---|---|---|
| 2012/0188906 A1* | 7/2012 | Ong | 370/254 |
| 2012/0224506 A1* | 9/2012 | Gredler et al. | 370/254 |
| 2013/0070638 A1* | 3/2013 | Iovanna et al. | 370/254 |
| 2013/0242804 A1* | 9/2013 | Yabusaki et al. | 370/255 |
| 2013/0315580 A1* | 11/2013 | Boertjes et al. | 398/5 |
| 2013/0336159 A1* | 12/2013 | Previdi et al. | 370/254 |
| 2014/0003232 A1* | 1/2014 | Guichard et al. | 370/230 |

OTHER PUBLICATIONS

Bernstein, G., et al., "Enabling High Bandwidth Networking as a Service (NaaS)," IEEE, Apr. 24, 2013, 10 pages.

\* cited by examiner

REPRESENTING BANDWIDTH CONSTRAINTS IN PARTIALLY CONTROLLED ENVIRONMENTS

CROSS-REFERENCE TO RELATED APPLICATIONS

The present application claims priority to U.S. Provisional Patent Application 61/669,991, filed Jul. 10, 2012 by Greg Bernstein, et. al., and entitled "Method for Representing Bandwidth Constraints in Partially Controlled Environments," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network carriers, also sometimes referred to as telecommunications operators or communications service providers, that run existing networks desire to optimize network utilization for passing traffic, such as Internet Protocol (IP) traffic, over the lower layers of the network, e.g., across Open Systems Interconnection (OSI) model layers 1 to 5 of the network. The optimized traffic may include traffic for triple play services (e.g., Video, Voice, and/or Data) and any type of bulk data transfer. In existing networks, end-to-end services are typically set-up by Operational Support Systems (OSS) systems or provider specific network management service applications. Network carriers have suggested scenarios for optimizing network utilization and traffic, such as optimizing existing network services and enabling new/emerging network application services.

SUMMARY

In one embodiment, the disclosure includes a network element (NE) comprising a receiver configured to receive a path computation request, a path computation element (PCE) coupled to the receiver and configured to compute a group of network paths through a network of NEs operating in a network stratum in response to the path computation request, wherein each network path comprises one or more physical links, and compute at least one constraint for each physical link, and an abstraction module coupled to the PCE and configured to receive the computed network path set and constraints, compute one or more abstract links that describe the network path group, and compute a constraint for each abstract link based on the physical link constraints.

In another embodiment, the disclosure includes a method comprising receiving data indicating one or more paths that traverse a network between a starting node and an ending node via one or more physical links, receiving data indicating a capacity for each physical link positioned along at least one path determining a path set for each physical link positioned along at least one path, wherein each path set comprises all subsets of any of the paths that traverse the associated physical link grouping all physical links associated with an identical path set as contained link groups determining an path set minimum for each contained link group, wherein the path set minimum indicates the capacity of the physical link that has a minimum capacity of the physical links in the associated contained link group, discarding each contained link group that is associated with a path set that is wholly included in a second contained link group's path set and comprises a path set minimum that is larger than the second contained link group's path set minimum, and designating each remaining contained length group as an abstract link comprising a capacity equal to the contained length group's path set minimum.

In another embodiment, the disclosure includes an apparatus comprising a receiver configured to receive a path computation request, wherein the path computation request comprises one or more constraints, a processor coupled to the receiver and configured to compute a plurality of candidate network paths through a network of links and nodes based on the constraint, wherein the links and nodes operate in a network stratum, and derive a service specific graph of the network that retains only the nodes and the links employed by the candidate paths.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
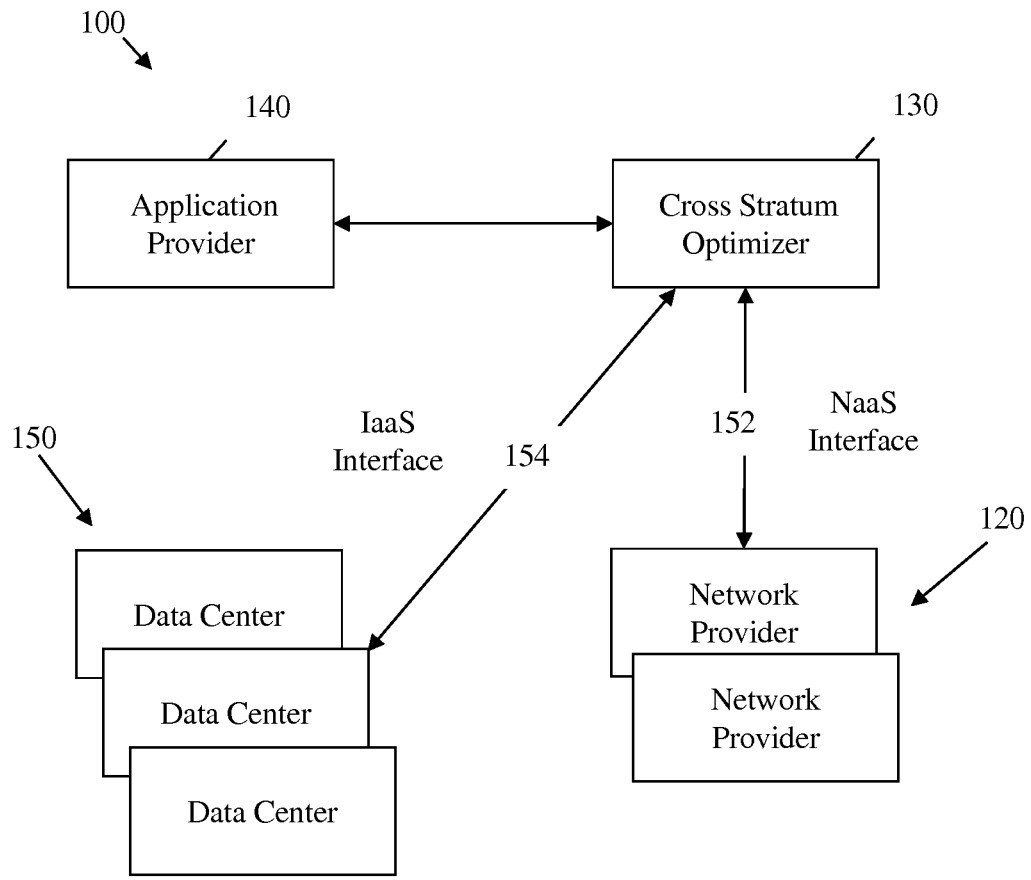
FIG. 1 is a schematic diagram of an embodiment of a Cross Stratum Optimization (CSO) network architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The provisioning and operation of new/emerging applications, such as cloud computing, may involve provisioning processing resources and/or storage space on multiple network components (e.g. servers). Based on the changing needs of a user, resources/data may be migrated between servers. Such transfers may be intra data center transfers, inter data center transfer, and/or inter telecommunications provider transfers. The network may be divided into an application stratum and a network stratum. The application stratum may include the applications and services implemented or operating in the application layer, the presentation layer, and/or the session layer of the OSI model. The network stratum may include processes operating in the transport layer, network layer, data link layer, and/or physical layer of the OSI model. Services operating in the application stratum may be aware of available server resources, but may not be aware of, and may not be configured to interpret data relating to, network topology and/or network resources. For example, an application stratum process may be configured to send a ping message to determine latency between two network nodes at a specific point in time, but may not be able to determine the reason for such latency, how such latency changes over time, and/or what the latency would be in when performing a multi-node to multi-node transfer. Likewise, network stratum processes may not have access and/or the ability to interpret application stratum resource data. Further, systems operating in different strata may be owned by different telecommunications providers. As such, complete inter strata sharing may result in unacceptable security concerns in some cases. For these reasons, services operating in either stratum may be unable to select optimal destination server(s) for data/resource migration due to lack of complete information, resulting in a server selection (SS) problem. Because of strict separation between the strata and separation between providers, handling and coordinating service provisioning across both the application stratum and the network stratum is different from handling traditional services, such as network provisioning of end-to-end telecommunications services.

Disclosed herein are embodiments that may be employed to abstract network stratum topology and resource data into a form that may be user-friendly to application stratum components and may prevent over disclosure of potentially sensitive network information between providers. In one embodiment, a NE operating in the network stratum may receive a path computation request from an application stratum NE for a multi-node to multi-node transfer. The network stratum NE may comprise a PCE configured to compute candidate paths that may traverse the network between source node(s) and destination node(s). The PCE may also determine constraints and/or capacities, such as bandwidth, for the links and/or network nodes along the candidate paths. The network stratum NE may further comprise an abstraction module which may abstract network data from the PCE by creating abstract link(s) that may span multiple links and/or nodes and may comprise a constraint equal to the worst case constraint for the spanned links and/or nodes (e.g. lowest bandwidth, highest latency, etc). The network stratum NE may then transmit the abstract links to the application stratum, which may provide the application stratum with sufficient information to make server selection and routing decisions while maintaining confidentiality of the physical structures. Further, the abstract links may be more easily processed by the application stratum NE than a complete listing of relevant links, nodes, and constraints. In another embodiment, the network stratum NE may compute a network graph of based on candidate paths. The network stratum NE may abstract graph links and/or otherwise reduce the graph. The resulting network data may then be forwarded to the application stratum in graph form (e.g. instead of link, node, and/or path form). Aspects of the present disclosure may also be found in "Enabling High Bandwidth Networking as a Service (NaaS)" by Bernstein and Lee, which is incorporated herein by reference as if reproduced in its entirety.

FIG. 1 is a schematic diagram of an embodiment of a CSO network 100 architecture. CSO network 100 may comprise at least one application provider 140, a one or more data centers 150, and one or more network providers 120, which may be coupled via a cross stratum optimizer 130. Network 100 may comprise and/or be implemented as part of a content delivery network (CDN). The application provider 140 may operate in an application stratum and may provide a service to end users. The application provider 140 may employ servers and/or virtual machine (VMs) located in the data centers 150 to provide resources (e.g. processing and/or storage resources) and may transmit data between data centers 150 and/or communicate with the end users via network providers 120. Components of the data centers 150 and/or network providers 120 may operate in the network stratum. The application provider 140 may direct movement of data by communicating with the data centers 150 and/or network providers 120 via the cross stratum optimizer 130, which may operate in the application stratum, and may be configured to communicate with the network stratum, for example via Infrastructure-as-a-Service (IaaS) Interface 154 and/or Network-as-a-Service (NaaS) interface 152.

The application provider 140 may be any entity or service that manages and/or distributes software based services to end users, end user networks, clients, local hosts, etc. The application provider 140 may provide services to a wide variety of related and/or unrelated users. For example, the application provider 140 may own, operate, and/or maintain a software application and may provide users with access to the software application, e.g. via a local client application with limited functionality. The application provider 140 may contract with network providers 120 and/or data center 150 operators, which may provide a platform to operate the application provider's 140 software.

A data center 150 may comprise a plurality of servers coupled via a switching fabric (e.g. a core network), which may be bounded by border routers at the edge of the data center's 150 domain. The data center 150 may employ a cloud computing environment in which servers are organized into VMs that may elastically provision resources (e.g. processing resources, communication resources, etc.) upon request. The data center 150 may also employ dedicated servers. A data center 150 and/or a data center 150 cluster may comprise an IaaS interface 154, which may accept service requests from the application provider 140 to perform tasks incident to operating the application provider's 140 services. For example, the IaaS interface 154 may be employed to allow the application provider 140 to provision data center 150 processors, memory, and/or request inter and/or intra data center 150 data movement.

A network provider 120 may operate a network of devices that may be employed to provide access to Internet backbone servers. As such, a network provider 150 may be considered an internet service provider. A network provider 120 domain may extend between a data center 150 domain and the Internet and/or between data centers 150. In some cases, data transmitted between data centers 150 may traverse multiple network providers 120. A network provider 120 may comprise the capability to optimize and/or allocate network resources to support high speed large scale data movement between data centers 150, for example inter-cloud connectivity services. The network provider 120 may provide virtual private network (VPN) services, bandwidth on demand (BoD), or other virtualization services. The network service provider 120 may comprise a NaaS interface 152, which may be employed by the application provider 140 to provision network resources and/or manage data movement across the network provider 120.

A cross stratum optimizer 130 may be any device configured to communicate requests and responses between the application provider 140, the data centers 150, and the network providers 120. The cross stratum optimizer 130 may operate in the application stratum and may be configured to communicate with components in the network stratum. For example, the cross stratum optimizer 130 may be configured to translate requests and responses between any connected entities. The cross stratum optimizer 130 may also operate as a load balancer and may provision data center resources 150 and network provider resources 120 in based on the requests needs and/or priorities of the application provider.

By employing network 100, an application service provider 140 may elastically provision resources in a plurality of data centers 150 via the cross stratum optimizer 130. For example, the application service provider 140 may provision resources that are located in close geographic proximity to specific users. As user demand and/or location changes, the application service provider 140 may provision different resources in other data centers 150 in order to change overall system topology accordingly. The application service provider 140 may also provision network resources from the network providers 120, via the cross stratum optimizer 130, to support data transfer between the various resources at potentially geographically remote data centers. Some of the objectives for optimizing the operations and/or interactions between the application stratum and the network stratum may include improving network capabilities, topology, provisioning, utilization monitoring, fault monitoring, or combinations thereof. For instance, the CSO network 100 may improve the exchange of network capabilities, application demand, resource information, topology, and/or traffic-engineering related information between the layers. The CSO network 100 may also improve initiating service instantiation of application to network with profile exchange (provisioning), exchanging application/network congestion/failure information (monitoring), or both. The CSO network 100 may be dynamic, which may allow responses to rapidly changing load and resource conditions, may require minimal information sharing amongst distinct business entities, may be able to deal with a wide range of network data plane and control technologies, and may efficiently handle high bandwidth networked applications that may utilize multiple concurrent information flows that may vie for limited network resources. Network 100 may be employed to resolve server selection problems that may occur in video on demand (VoD) services and/or problems that may occur when scheduling of large data transfers such as backups.

Figure 2:
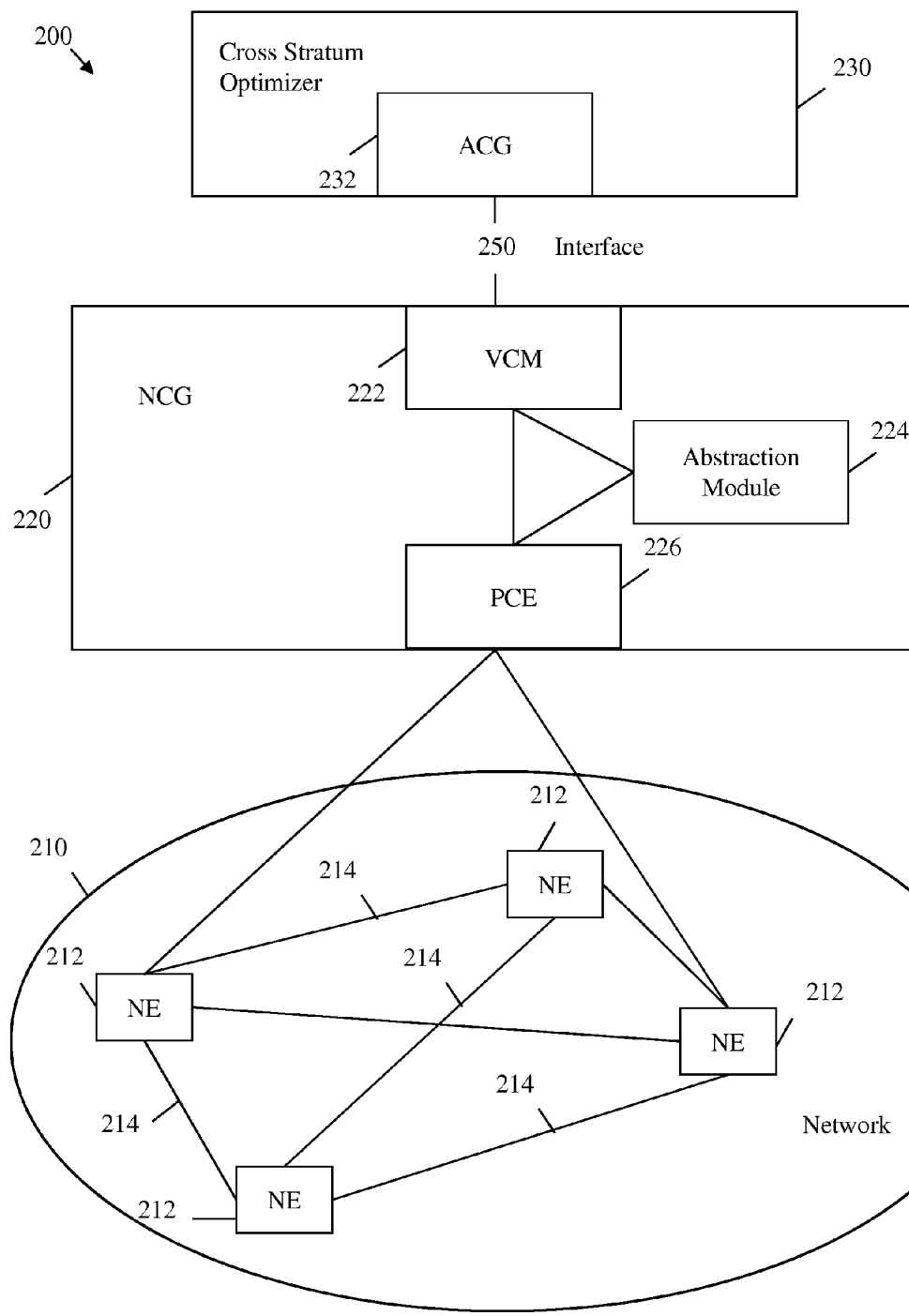
FIG. 2 is a schematic diagram of another embodiment of a CSO network architecture.

FIG. 2 is a schematic diagram of another embodiment of a CSO network 200 architecture. Network 200 may comprise a cross stratum optimizer 230, which may be substantially similar to cross stratum optimizer 130. Network 200 may further comprise a Network Control Gateway (NCG) 220 and a network 210 of NEs 212. The NCG 220, and network 210 may be located in a network provider 120 and/or a data center 150. The cross stratum optimizer 230 may transmit path computation requests to the NCG 220 on behalf of an application provider such as application provider 140. Such requests may traverse an interface 250, which may be an IaaS interface 154, a NaaS interface 152, or other interface. The NCG 220 may comprise a PCE 226, which may be configured to calculate candidate paths though network 210 and determine constraints associated with the candidate paths, NEs 212, links 214, or combinations thereof. The NCG 220 may further comprise an abstraction module 224, which may abstract data calculated by the PCE 226 and forward such abstracted data to the cross stratum optimizer 230.

The cross stratum optimizer 230 may comprise an application control gateway (ACG) 232. The ACG 232 may be configured to act as a virtual client on behalf of an application and/or application provider. The ACG 232 may make requests to provision network 210 resources for the requesting application (e.g. based on constraints), receive associated responses from the network stratum, and communicate the status of such requests to the application provider. The ACG 232 may translate communications between the application stratum and the network stratum. The ACG 232 may also be configured to make provisioning decisions on behalf of the application based on criteria transmitted by the application, for example source and destination, highest capacity (e.g. bandwidth), lowest latency, lowest cost, highest reliability, etc. As an example, the ACG 232 may be implemented as a south bound interface for a software defined network (SDN).

Network 210 may comprise a wavelength switched optical network (WSON), a multiprotocol label switching (MPLS) network, an Optical Transport Network (ONT), Wavelength Division multiplexing (WDM) network, Time Division Multiplexing (TDM) network, Ethernet network, Internet Protocol (IP) network, OpenFlow network, virtual local area network (VLAN), or other network configuration. The network 210 may operate in the network stratum and may be unable to directly interpret and/or respond to requests from the application stratum. The network 210 may comprise a plurality of NEs 212 which may be connected via links 214. Links 214 may be optical links, electrical links, or combinations thereof. Links 214 may be considered physical links as links 214 may be directly associated with hardware components. NEs 212 may comprise servers, switches, routers, transmitters, receivers, memory components, or other devices commonly present in a data center, a service provider network, or combinations thereof.

The NCG 230 may operate in the network stratum and may comprise a virtual control management (VCM) component, an abstraction module, and a PCE. The NCG 220 may be configured to control provisioning and/or operation of the network 210. For example, the VCM 222 may be configured to receive requests from the ACG 232 via the interface 250. The VCM 222 may translate such requests and forward them to the PCE 226. As an example, the VCM 222 may operate as a north bound interface for a SDN. As another example, the VCM 222 may communicate with the ACG 232 via an application layer traffic optimization (ALTO) protocol. The PCE 226 may be configured to calculate paths across network 210. PCE 226 may also be aware of constraints associated with the NEs 212, links 212, or combinations thereof. For example, the PCE 226 may have access to a traffic engineering (TE) database or other database that may be updated via interior gateway protocols (IGPs) such as Open Shortest Path First (OSPF), Intermediate System to Intermediate System (IS-IS), Routing Information Protocol (RIP), Interior Gateway Routing Protocol (IGRP), etc., via a Border Gateway Protocol (BGP), or other protocols. The PCE 226 may calculate candidate paths across network 210 based on requests from the VCM 222 in light of the network constraints and any requested constraints and forward data to the abstraction module 224 indicating candidate path links (e.g. links 214), candidate path nodes (e.g. NEs 212), and constraints associated with each node, each link, and/or each end to end path as network data. The abstraction module 224 may be configured to abstract the network data into a form usable by the cross stratum optimizer 230 and/or the ACG 232. For example, the abstraction module 224 may be configured to replace links 214 and/or NEs 212 with abstract links with constraints based on the minimum and/or maximum constraints of the replaced devices. The abstractions may reduce the complexity of the network data, and may also hide sensitive network data. The abstraction module 224 may forward the abstracted data to the VCM 222 for transmission to the ACG 232. The abstracted data may be transmitted as a list of candidate paths between a source node and a destination node (e.g. as specified by the ACG 232 and/or a related application provider), a list of abstracted links, a list of nodes, a list of physical links, a service specific network graph, an abstracted network graph, or combinations thereof.

As such, NCG 220 may be configured to receive path computation and/or reservation requests from a cross stratum optimizer 230 operating in the application stratum. The requests may comprise source node(s) and/or destination node(s) for data transfer along with requested constraints such as a requested bandwidth allocation, minimum latency, a reliability metric, etc. The NCG 220 may compute candidate paths through network 210 via the PCE 226, abstract network data related to the candidate paths via the abstraction module 224, and respond to the path computation request by forwarding the abstracted network data to the cross stratum optimizer 230 via the VCM 222. The abstracted data may be presented in a reduced form that may be easily interpreted by the cross stratum optimizer 230, may be require less data be communicated across interface 250, and may preserve confidentiality in the event that NCG 220 and network 210 are owned by a different entity than the cross stratum optimizer 230, for example when the NCG 220 and network 210 are positioned in data center 150 and/or a network provider 120 and the cross stratum optimizer 230 is positioned in an application provider 140 network.

Figure 3:
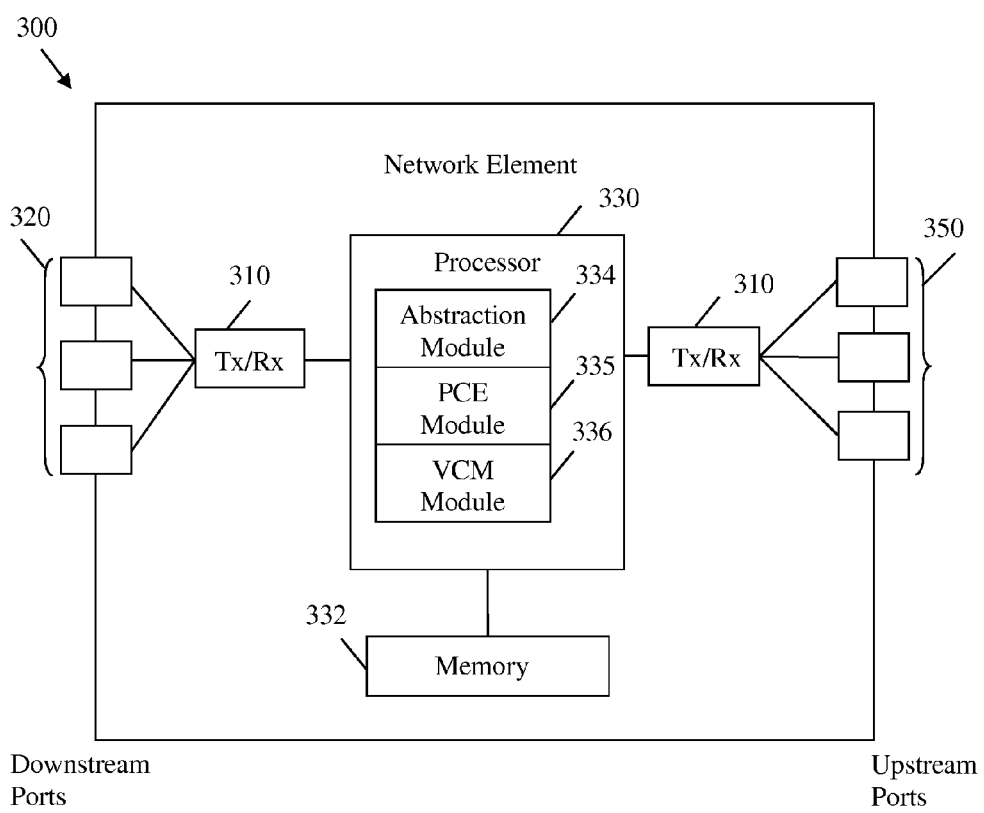
FIG. 3 is a schematic diagram of an embodiment of a NE which may act as a node within a CSO network architecture.

FIG. 3 is a schematic diagram of an embodiment of a NE 300 which may act as which may act as a node within a CSO network architecture, such as an NCG 220. NE 300 may be configured to receive path computation requests, compute candidate paths, and abstract network links and/or graphs for use by the application stratum. NE 300 may be implemented in a single node or the functionality of NE 300 may be implemented in a plurality of nodes (e.g. in a network provider 120 or a data center 150). In some embodiments NE 300 may also act as other node(s) in network 100 and/or 200, such as cross stratum optimizer 230 and/or an NE 212. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure may be implemented in a network apparatus or component such as an NE 300. For instance, the features/methods in the disclosure may be implemented using hardware, firmware, and/or software installed to run on hardware. The NE 300 may be any device that transports frames through a network, e.g., a switch, router, bridge, server, a client, etc. As shown in FIG. 3, the NE 300 may comprise transceivers (Tx/Rx) 310, which may be transmitters, receivers, or combinations thereof. A Tx/Rx 310 may be coupled to plurality of downstream ports 320 (e.g. downstream interfaces) for transmitting and/or receiving frames from other nodes and a Tx/Rx 310 coupled to plurality of upstream ports 350 (e.g. upstream interfaces) for transmitting and/or receiving frames from other nodes, respectively. A processor 330 may be coupled to the Tx/Rxs 310 to process the frames and/or determine which nodes to send frames to. The processor 330 may comprise one or more multi-core processors and/or memory devices 332, which may function as data stores, buffers, etc. Processor 330 may be implemented as a general processor or may be part of one or more application specific integrated circuits (ASICs) and/or digital signal processors (DSPs). Processor 330 may comprise an abstraction module 334, a PCE module 335, and/or a VCM module 336, which may implement the functionality of abstraction module 224, PCE 226, and/or VCM 222, respectively. In an alternative embodiment, the abstraction module 334, PCE module 335, and/or VCM module 336 may be implemented as instructions stored in memory 332, which may be executed by processor 330. In another alternative embodiment, the abstraction module 334, PCE module 335, and/or VCM module 336 may be implemented on separate NEs. The downstream ports 320 and/or upstream ports 350 may contain electrical and/or optical transmitting and/or receiving components.

It is understood that by programming and/or loading executable instructions onto the NE 300, at least one of the processor 330, abstraction module 334, PCEt module 335, downstream ports 320, Tx/Rxs 310, memory 332, and/or upstream ports 350 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
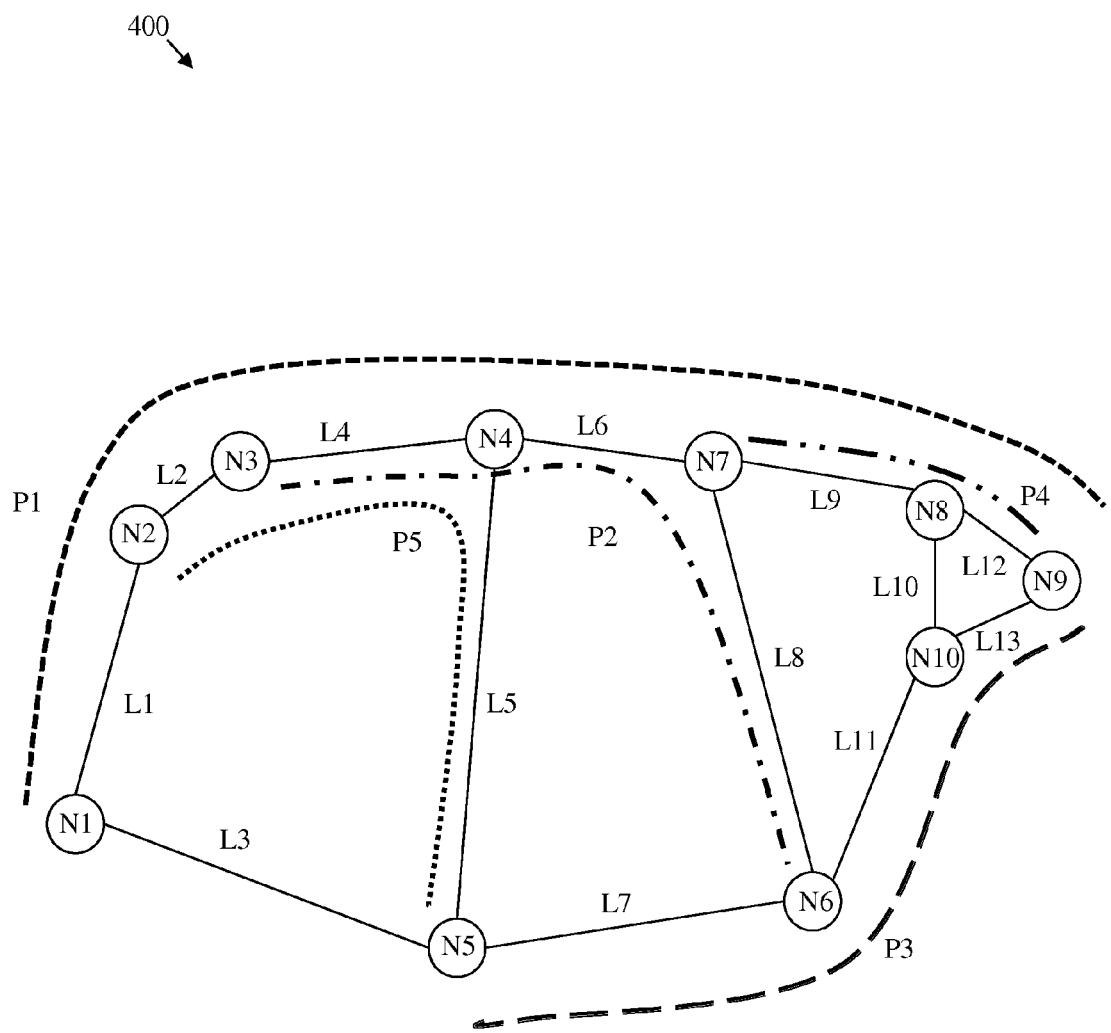
FIG. 4 is a schematic diagram of an example network stratum network.

FIG. 4 is a schematic diagram of an example network stratum network 400, which may be substantially similar to network 210. Network 400 may comprise nodes N1-N10, which may each be substantially similar to NEs 212. Nodes N1-N10 may be coupled via links L1-L13, which may be substantially similar to links 214. Nodes N1-N10 and links L1-L13 may arranged as shown in FIG. 4. In an example, a PCE such as PCE 226 may calculate a plurality of candidate paths P1-P5 traversing network 400 between a source node and destination node pair of N1 and N9 based on network constraints. Candidate paths P1-P5 are shown in FIG. 4 as lines of varying style positioned substantially parallel to the links and/or nodes they traverse. Network 400 is purely an example network and is included herein to provide a working example of the methods discussed hereinbelow.

Figure 5:
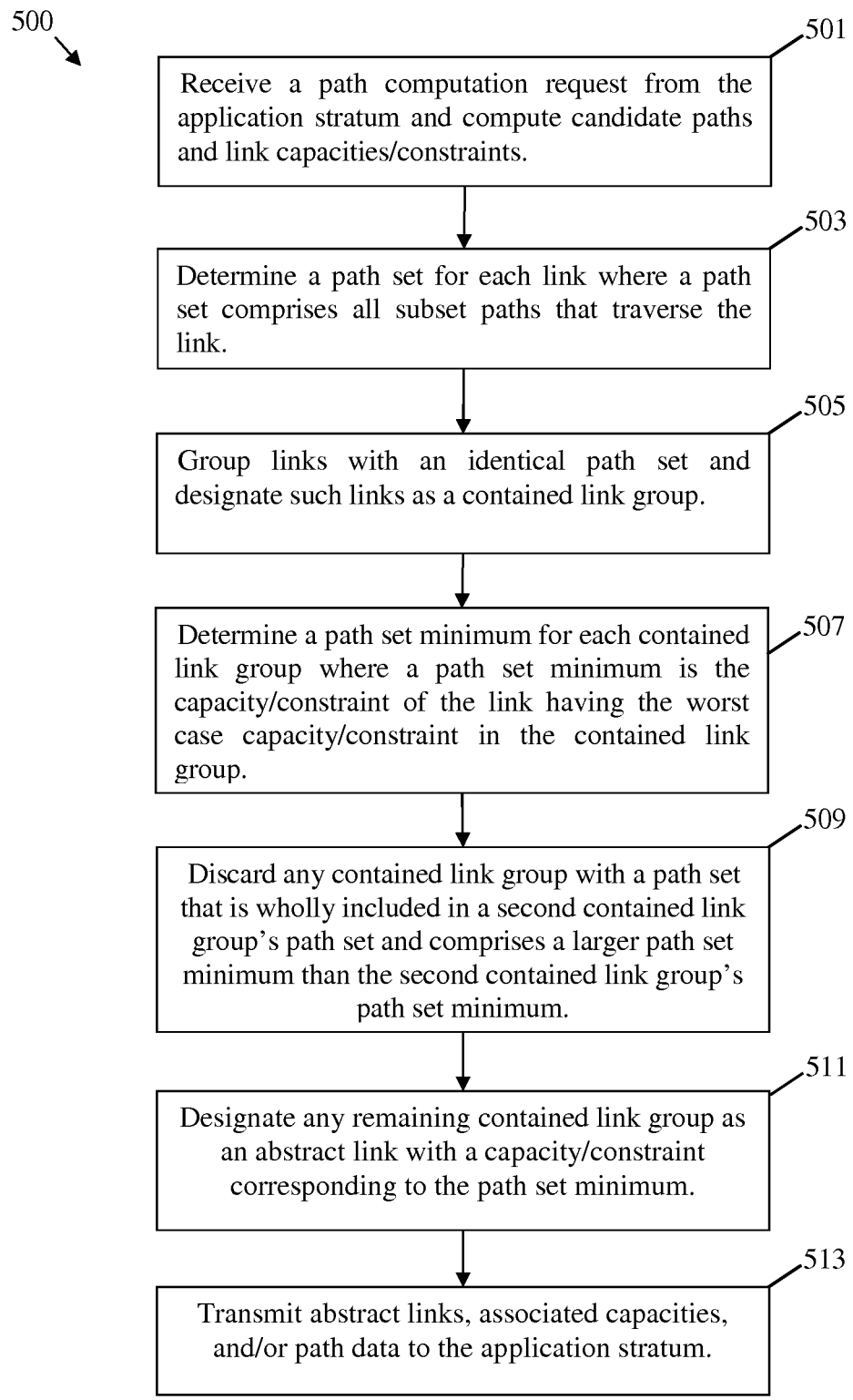
FIG. 5 is a flow chart of an embodiment of a method of abstracting a network stratum network.

FIG. 5 is a flow chart of an embodiment of a method 500 of abstracting a network stratum network, such as example network 400. Method 500 may be employed by a network such as CSO network 200 and may be used to abstract a network positioned in a network provider network 120 and/or a data center network 150 on behalf of an application provider 140. Method 500 may be employed to perform multi-commodity flow optimization, concurrent optimization, etc. At step 501, a path computation request may be received from an application stratum component such as ACG 232. The path computation request may be received by an NCG such as NCG 220 at VCM 222. The path computation request may comprise one or more requested constraints and/or a source node and destination node pair. For example, the request may direct an NCG to determine five candidate paths with the highest available bandwidth capacity. As another example, the request may direct an NCG to determine all candidate paths that traverse specified nodes, all candidate paths that comprise a specified minimum available bandwidth capacity, all candidate paths comprising a maximum specified routing cost, etc. Based on the request constraints, candidate path, such as P1-P5, may be computed, e.g. by a PCE such as PCE 226, along with associated link and/or node capacities and/or constraints. The computed paths, link data, node data, constraint data, and any other relevant network data may be forwarded to an abstraction module such as abstraction module 224.

At step 503, a path set may be determined for each link associated with a candidate path. Links associated with a path may be considered contained links as such links may be contained in a description of such path. A path set may comprise all sub-sets of candidate paths that traverse the associated link. Path sets for example network 400 may be shown in the following table:

TABLE 1

| Contained Links | Path Sets |
|---|---|
| L1 | {P1} |
| L2 | {P1 P5} |
| L4 | {P1, P2, P5} |
| L5 | {P5} |
| L6 | {P1, P2} |
| L7 | {P3} |
| L8 | {P2} |
| L9 | {P1, P4} |
| L11 | {P3} |
| L12 | {P1, P4} |
| L13 | {P3} |

As shown, no paths traverse links L3 and L10, which are not included in table 1. Links L1, L2, L4-L9, and L11-L13 are traversed by subsets of candidate paths P1-P5 as shown in table 1.

At step 505, links with identical path sets may be grouped, which may result in the following table:

TABLE 2

| Contained Link Groups | Path Sets |
|---|---|
| L1 | {P1} |
| L2 | {P1 P5} |
| L4 | {P1, P2, P5} |
| L5 | {P5} |
| L6 | {P1, P2} |

TABLE 2-continued

| Contained Link Groups | Path Sets |
|---|---|
| L7, L11, L13 | {P3} |
| L8 | {P2} |
| L9, L12 | {P1, P4} |

As shown above, links L7, L11, and L13 and links L9 and L12 may have an identical path sets, respectively, and may be grouped as shown in table 2.

At step 507, a path set minimum may be determined for each contained link group. Each link may be associated with a constraint specified in step 1, for example available bandwidth. A path set minimum may be a worst case constraint and/or capacity of all the links in the group. For example, links L1-L13 may comprise the following available capacity denoted as Bx, where B indicates bandwidth and x indicates link number: B1=10, B2=7, B3=5, B4=6, B5=9, B6=12, B7=8, B8=11, B9=5, B10=7, B11=8, B12=7, B13=5. Bandwidth capacity is denoted herein as a unitless value for purposes of clarity of explanation, however, such values may be associated with units appropriate to an associated network, e.g. bits per second. As such, step 507 may result in the following table:

TABLE 3

| Contained Link Groups | Path Sets | Path Set Minimum |
|---|---|---|
| L1 | {P1} | 10 |
| L2 | {P1 P5} | 7 |
| L4 | {P1, P2, P5} | 6 |
| L5 | {P5} | 9 |
| L6 | {P1, P2} | 12 |
| L7, L11, L13 | {P3} | 5 |
| L8 | {P2} | 11 |
| L9, L12 | {P1, P4} | 5 |

As shown above, links L7, L11, and L13 comprise capacities of 8, 8, and 5, respectively, the minimum value of which may be 5 and may be assigned as the path set minimum of the link group as shown in table 3. Also, links L9 and L12 may comprise capacities of 5 and 7, respectively, the minimum value of which may be 5 and may be assigned as the path set minimum of the link group.

At step 509, the contain link groups may be compared. A first contained link group that comprises a path set wholly included in a second contained link groups path set may be discarded when the path set minimum of the first contained link group is larger than the path set minimum of the second contained link group. The operation of step 507 may reduce potentially unnecessary network data in the table by considering the potential capacity of path segments spanning potential decision points and ignoring links along such segments that have extra capacity that may not be used by the path due to bottlenecks associated with other links. The operation of step 507 may further reduce the table resulting in the following:

TABLE 4

| Contained Link Groups | Path Sets | Path Set Minimum |
|---|---|---|
| L4 | {P1, P2, P5} | 6 |
| L7, L11, L13 | {P3} | 5 |
| L9, L12 | {P1, P4} | 5 |

As shown above, contained link groups L1, L2, L5, and L6 may each comprise path sets that are wholly included in the path set of contained link group L4. Further, contained link groups L1, L2, L5, and L6 may each comprise path set minimums that may be larger than the path set minimum of contained link group L4, e.g. 10, 7, 9, 12, and 11 versus 6, respectively. As such, contained link groups L1, L2, L5, and L6 may be discarded. At step 511, each remaining contained link group may be designated as an abstract link with a constraint and/or capacity of the associated path set minimum. For example, groups (L4), (L7 L11 L13), and (L9 12) may be designated abstract links A, B, and C, with available bandwidth capacity of 6, 5, and 5, respectively. At step 513, the abstract links, capacities/constraints, and associated path information may be transmitted to the application stratum as abstracted network data. For example, the abstraction module (e.g. abstraction module 224) may transmit the abstracted network data to the VCM (e.g. VCM 222) for transmission to the ACG (e.g. 232). The abstract links may be defined and/or transmitted using the form $Q(NsNr)Y(Pi,NsNr) \leq C$, where $Q(Ns,Nr)$ denotes demands between nodes Ns and Nr, $Y(Pi, NsNr)$ denotes a path flow Pi between nodes Ns and Nr, and C denotes an abstract link constraint. Using such a form, abstract links A, B, and C may be defined and/or transmitted as follows:

Abstract link A: $Q(N1N9)Y(P1,N1N9)+Q(N3N5)Y(P2,N3N6)+Q(N2N5)Y(P5,N2N5) \leq 6$

Abstract link B: $Q(N5,N9)Y(P3, N5N9) \leq 5$

Abstract link C: $Q(N1N9)Y(P1,N1N9)+Q(N7N9)Y(P4,N7N9) \leq 5$

By employing method 500, an NCG coupled to network 400 may transmit constraint information for three abstract links A, B, and C, instead of constraint information on thirteen links. As such, the amount of information sent to the application stratum may be significantly reduced and information about the physical infrastructure of network 400 may be masked. However, the abstracted network data transmitted to the application stratum may be sufficient to make routing determinations based on the availability of candidate paths P1-P5 and worst case constraints associated with each such path. As shown above, method 500 may allow application stratum components to make informed routing decisions, while maintaining confidentiality of the network stratum and reducing the transmission situationally extraneous information, which may burden the application stratum component.

It should also be noted that the request of step 501 may comprise a demand for resources (e.g. requested capacity) associated requested candidate paths. In that event, the demand for the computed path(s) that traverse an abstract link may be added together. If the sum of the requested demand over an abstract link is less than the path set minimum, the path set minimum may always be satisfied, and may thus be discarded prior to transmission at step 513. As such, constraint information being transmitted to the application stratum may be further reduced when such information is unhelpful in determining path selection.

Figure 6A:
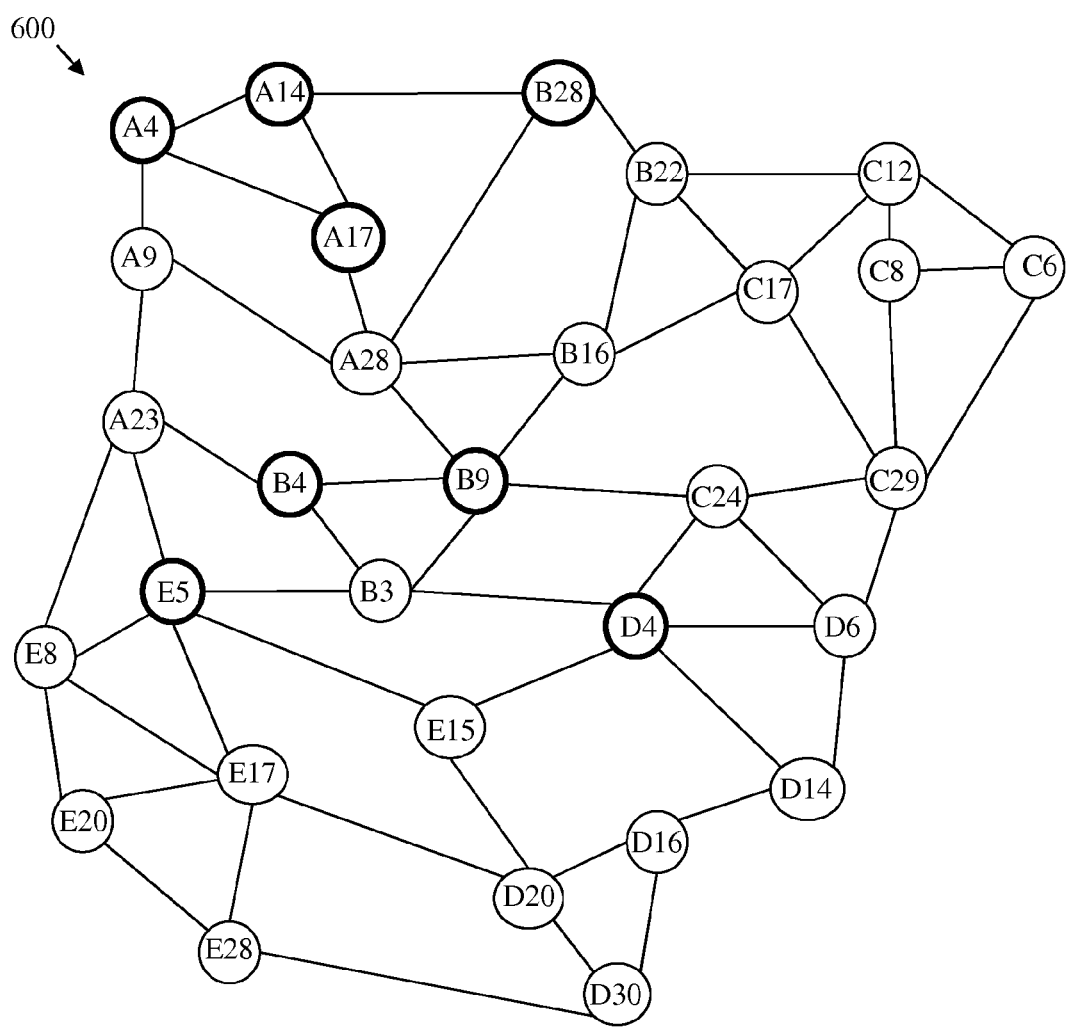
FIG. 6A is a schematic diagram of another example network stratum network.

FIG. 6A is a schematic diagram of another example network stratum network 600, which may be substantially similar to network 210. Network 600 may comprise nodes A4, A9, A14, A17, A23, B3, B4, B9, B16, B22, B28, C6, C8, C12, C17, C24, C29, D4, D6, D14, D16, D20, D30, E5, E8, E15, E17, E20, and E28, which may each be substantially similar to NEs 212. The nodes of network 600 may be arranged as shown in FIG. 6, and may be coupled via links, which may be substantially similar to links 214. In an example, a NCG such as NCG 220, may receive a path computation request from a cross stratum optimizer, such as cross stratum optimizer 230. The request may comprise a list of candidate communicating nodes, for example (A4, B9) (A14, B4), (B28, E5), and (A17, D4). Candidate communicating nodes are indicated in FIG. 6 by bold typeface circles illustrated on the associated nodes. The request may further comprise a particular constraint of interest such as lowest latency, lowest cost, highest reliability, highest bandwidth. A PCE such as PCE 226 may determine links that may be employed between the candidate communicating nodes while satisfying the constraint. The PCE may forward such links to abstraction module, such as abstraction module 224, which may generate a service specific graph comprising only the links that satisfy the requested constraints.

Figure 6B:
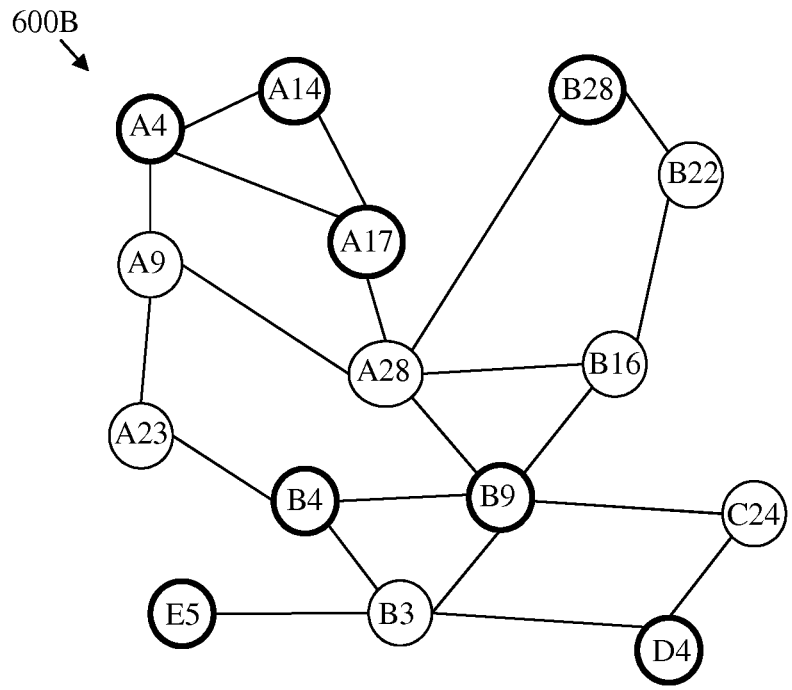
FIGS. 6B-6D are schematic diagrams of example service specific graphs of the network depicted in FIG. 6A.
Figure 6C:
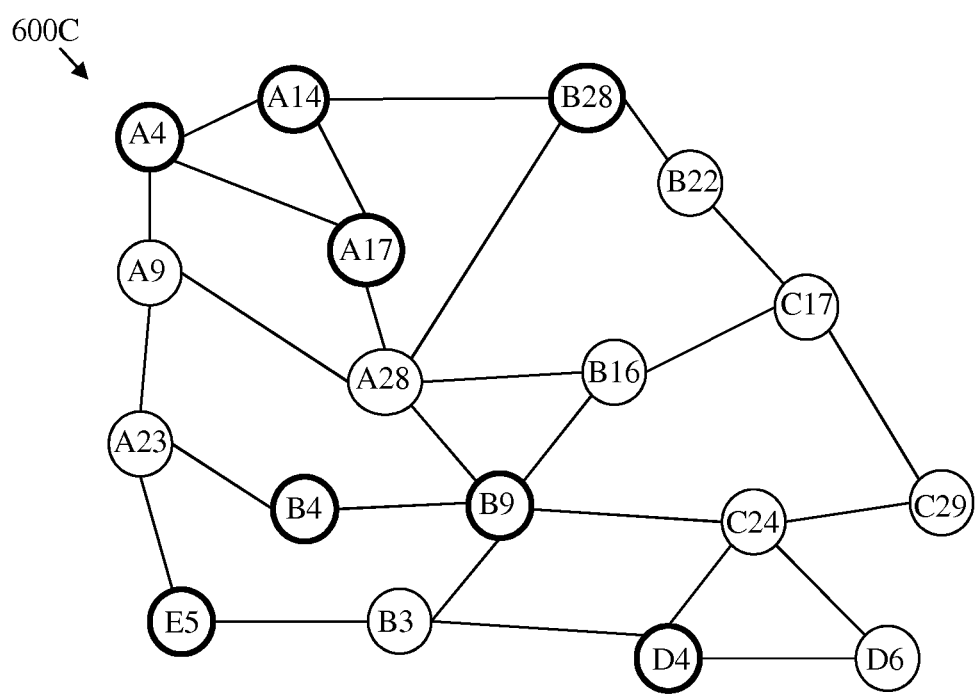
Figure 6D:
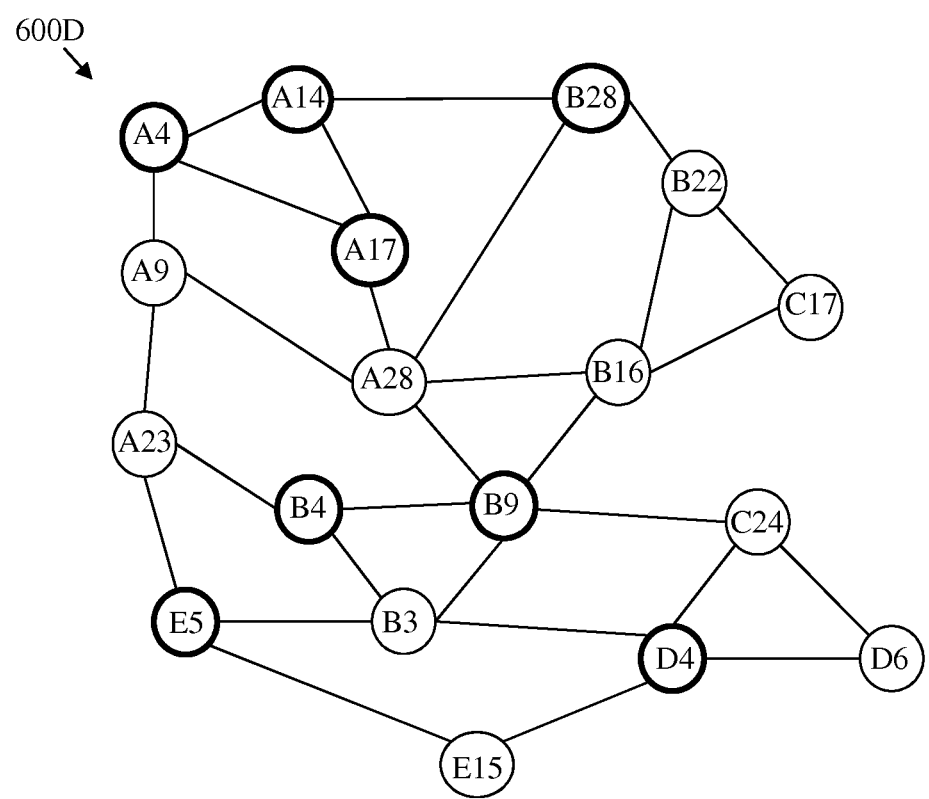

FIGS. 6B-6D are schematic diagrams of example service specific graphs 600B, 600C, and 600D, respectively of the network depicted in FIG. 6A. For example, graph 600B may describe a subset of network 600, wherein all links of graph 600B can be utilized on a lowest latency basis for a transfer between candidate communicating nodes. As another example, graph 600C may comprise a subset of network 600, wherein all links of graph 600C can be utilized on a lowest routing cost basis for a transfer between candidate communicating nodes. As another example, graph 600D may comprise a subset of network 600, wherein all links of graph 600D can be utilized on a lowest latency and highest reliability basis for a transfer between candidate communicating nodes. The NCG may be configured to transmit the service specific graphs to the application stratum. Furthermore, such graphs may be reduced and/or abstracted based on the method discussed hereinbelow prior to transmission to increase confidentiality and reduce transmission of extraneous information.

Figure 7:
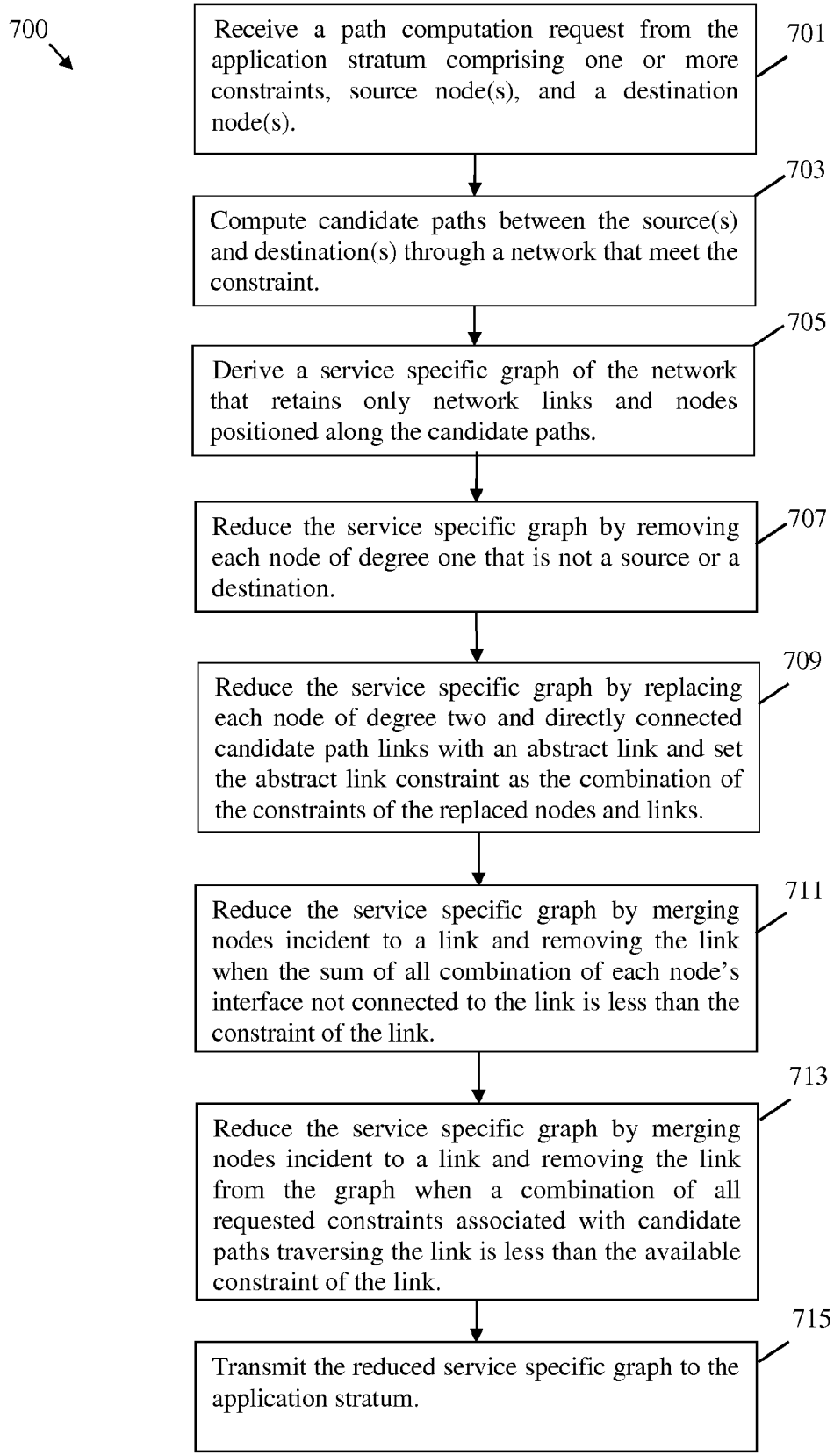
FIG. 7 is a flow chart of an embodiment of a method of reducing a network graph.

FIG. 7 is a flow chart of an embodiment of a method 700 of reducing a network graph, such as example network 600 and/or example networks discussed below. Method 700 may be employed by a network such as CSO network 200 and may be used to abstract a network positioned in a network provider network 120 and/or a data center network 150 on behalf of an application provider 140. At step 701, a path computation request may be received from the application stratum (e.g. ACG 232). The request may comprise one or more constraints, source node(s), and a destination node(s). At step 703, candidate paths between the source(s) and destination(s) that meet the requested constraint may be computed (e.g. by a PCE 226). At step 705, a service specific graph of the network may be derived (e.g. by an abstraction module 224) that retains only network links and nodes positioned along the candidate paths. For example, step 703 and 705 may result in generating a graph such as 600B, 600C, and/or 600D, respectively, from the same network 600 based on the requested constraint. Such service specific graphs and/or other network graphs may be reduced (e.g. by an abstraction module 224) as discussed below.

At step 707, the graph of step 705 may be reduced by removing each node of degree one that is not a source node or a destination node. A node of degree may indicate a number of graph links connecting the node to other nodes. For example a node of degree one may be connected to a graph by a single link, a node of degree two may be connected to a graph by two links, a node of degree three may be connected to a graph by three links, etc. Nodes of degree one may be removed, because any path traversing such a node may be required to traverse the single link twice unless the node is a source or destination. Such nodes may not be useful for path routing purposes.

At step 709, the graph may be further reduced by replacing each node of degree two and directly connected candidate path links with an abstract link, as any path traversing the node may also traverse both links. The resulting abstract link may comprise a constraint equal a combination of the constraints of the replaced nodes and links. For example, a routing cost may equal the sum of the constraints, an available bandwidth may equal the minimum available bandwidth of the constraints, etc.

At step 711, the graph may be further reduced by merging nodes incident to a link, which may result in an abstract node, and removing the link when the sum of all constraints of each node's interfaces not connected to the link is less than the constraint of the link. For example, a network may comprise so called high capacity links, which may act as communications trunks. Nodes on either end of the high capacity link may comprise interfaces facing away from the high capacity link with lower capacities than the high capacity link. As such, the lower capacity links may act as a bottle neck on either side of the high capacity link. Such nodes may act in a similar manner as a single node for routing purposes and may be combined. As a specific example, a node N1 may comprise three low capacity interfaces each comprising a bandwidth capacity of one unit (e.g. three total capacity). A node N2 may also comprise three interfaces each comprising a bandwidth capacity of two units (e.g. six total capacity.) Nodes N1 and N2 may be coupled via a high capacity link. If the high capacity link has a capacity of seven, the nodes may be merged as the capacity of seven is greater than the total capacity of the low capacity interfaces of either node (e.g. three and six, respectively). If the high capacity link has a capacity of five, the nodes may not be merged as five is less than the low capacity interfaces of N2, which may indicate the high capacity link may become a bottleneck for communication received from N2 in some cases.

At step 713, the graph may be further reduced by merging nodes incident to a link, which may result in an abstract node, and removing the link from the graph when a combination of all requested constraints associated with candidate paths traversing the link is less than the available constraint of the link. For example, a path computation request from the application stratum may indicate that an application provider such as application provider 140 wishes to move twenty five units of data. If a pair of nodes connected by a link have thirty units of available capacity (e.g. the requested constraint is less than the available constraint), the nodes and the link may support the transmission of all of the data. As the requested constraint may always be satisfied under all circumstances, the nodes and link may be removed from consideration, which may further simplify the graph.

At step 715, the reduced graph may be transmitted to the application stratum in response to the request of step 701. It should be noted that steps 707, 709, 711, and 713 may each be applied repeatedly, either in order, out of order, or otherwise, to reduce the graph to the simplest abstract graph possible. The reductions and/or abstractions of method 700 may promote confidentiality by masking infrastructure components of the network stratum network and reduce complexity of cross stratum transmissions by employing a simplified graph, while still forwarding associated routing and constraint information to allow the application stratum to make informed routing decisions.

Figure 8A:
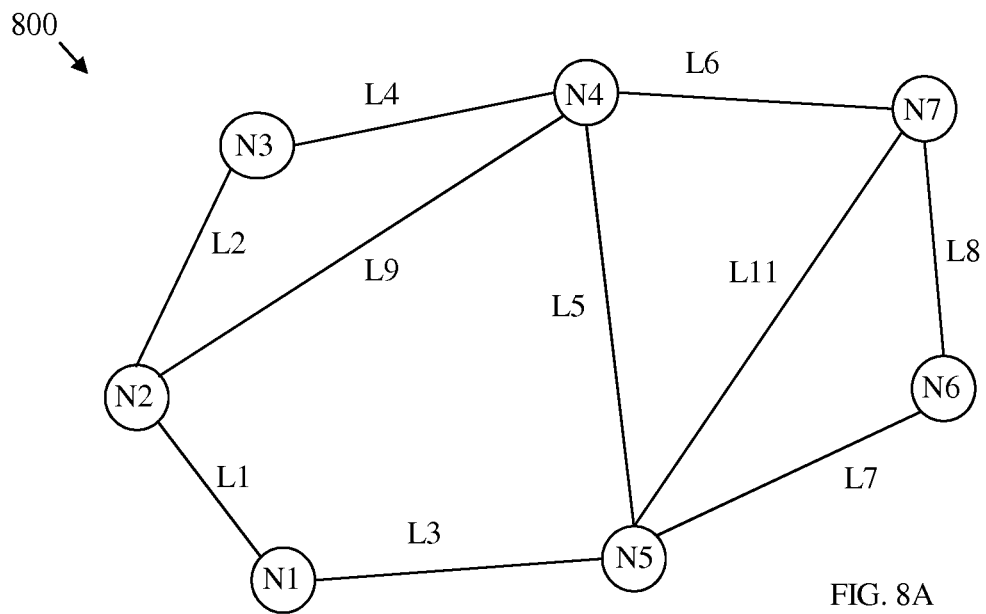
FIG. 8A is a schematic diagram of another example network stratum network.
Figure 8B:
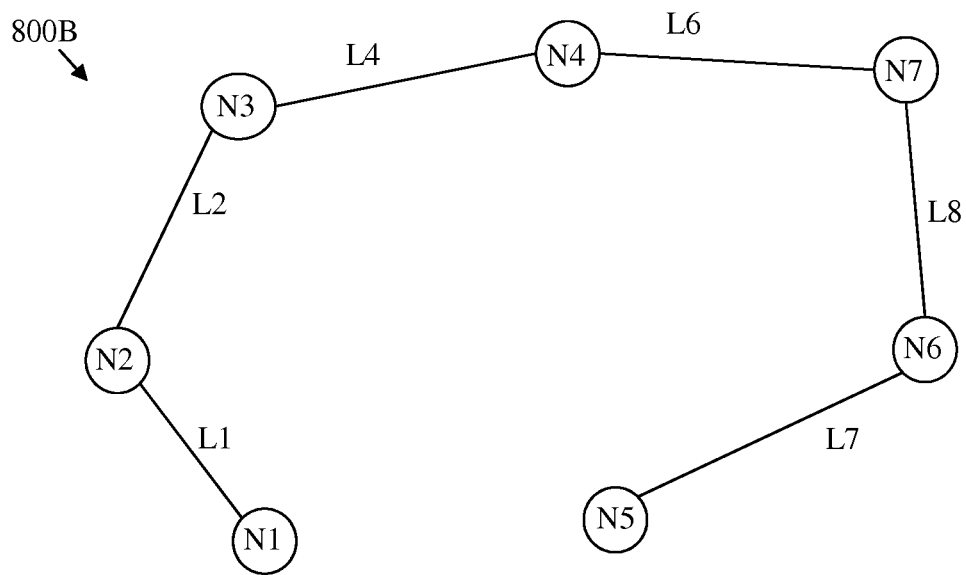
FIGS. 8B-8G are schematic diagrams of example abstract graphs of the network depicted in FIG. 8A.

FIG. 8A is a schematic diagram of another example network stratum network 800. Network 800 may comprise nodes N1-N7, which may be substantially similar to NEs 212, and which may be connected via links L1-L9 and L11, which may be substantially similar to links 214. Network 800 may be an example Ethernet network, which may support a Multiple Spanning Tree Protocol (MSTP). MSTP may be employed to create Multiple Spanning Tree Instances (MSTI), which may be non-looping routes across the network 800.

Figure 8C:
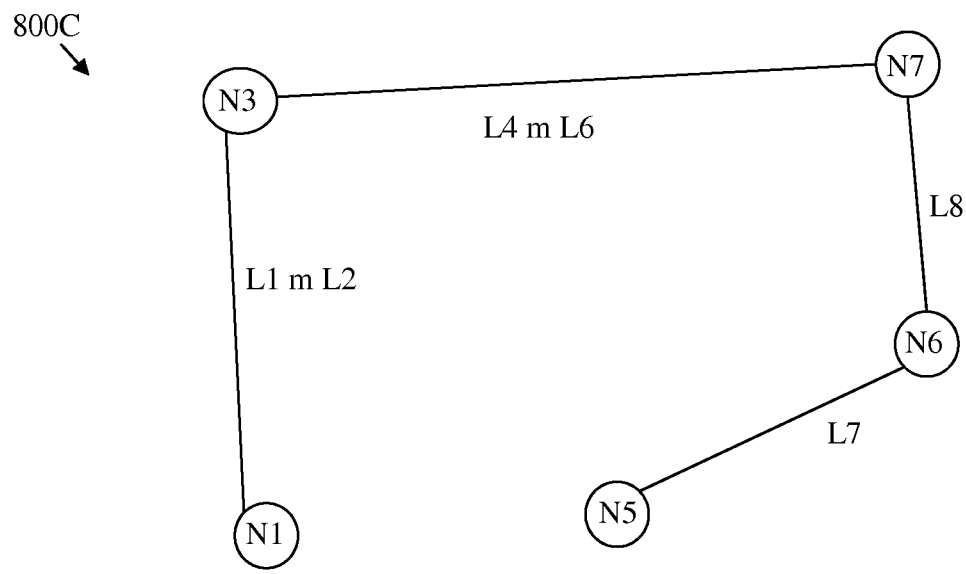
Figure 8D:
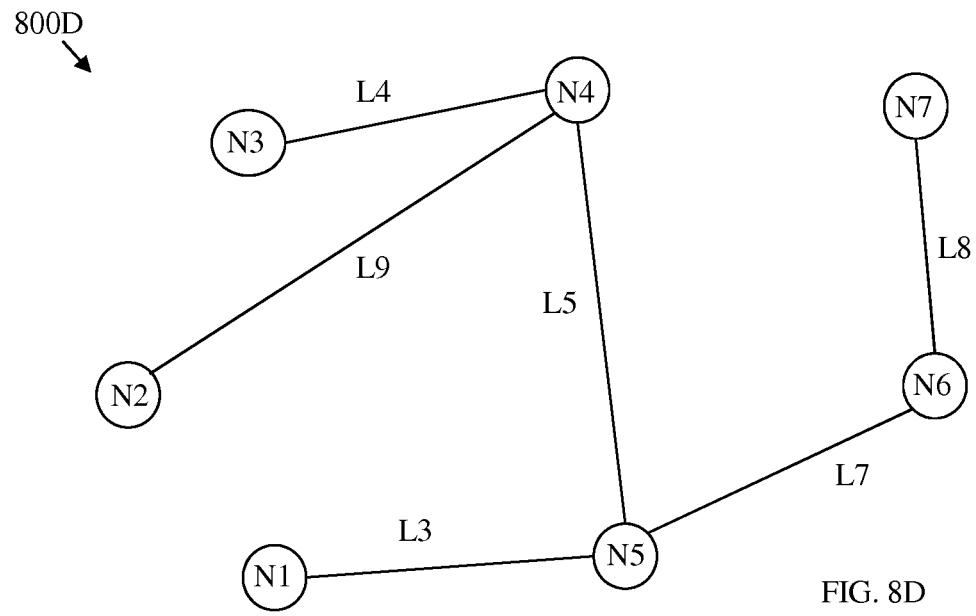
Figure 8E:
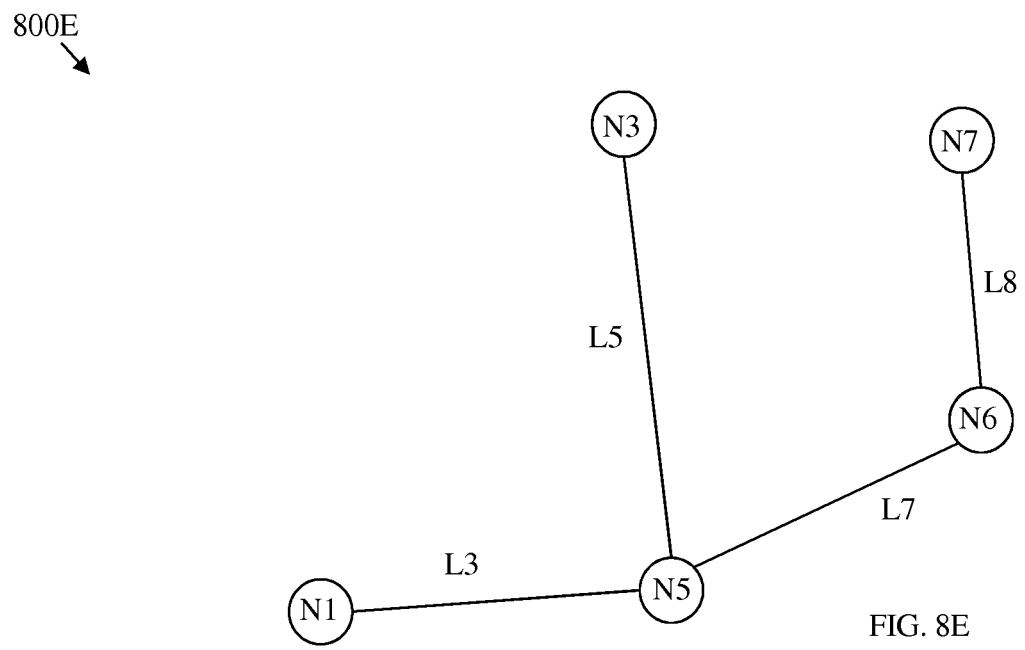
Figure 8F:
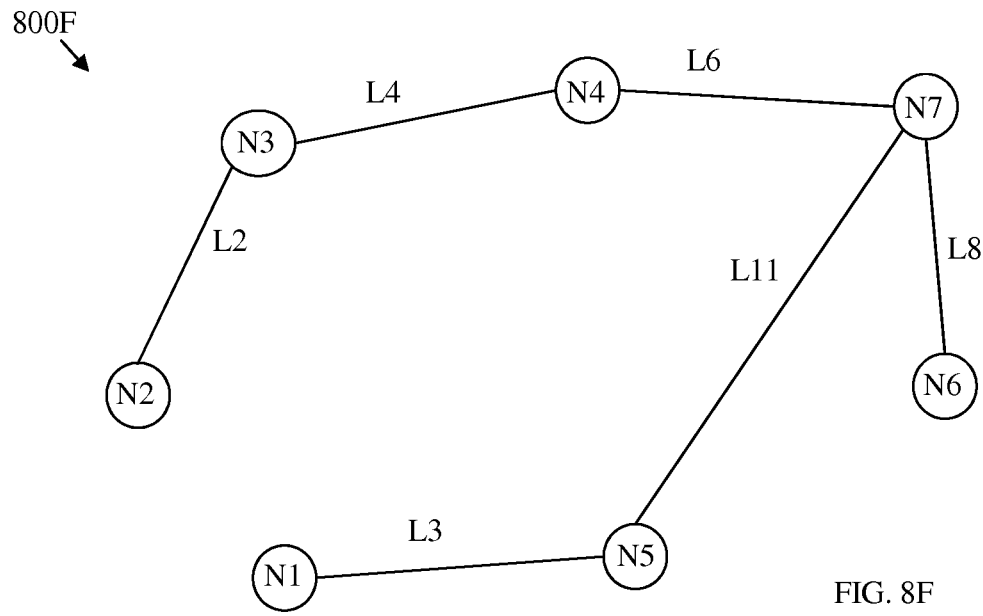
Figure 8G:
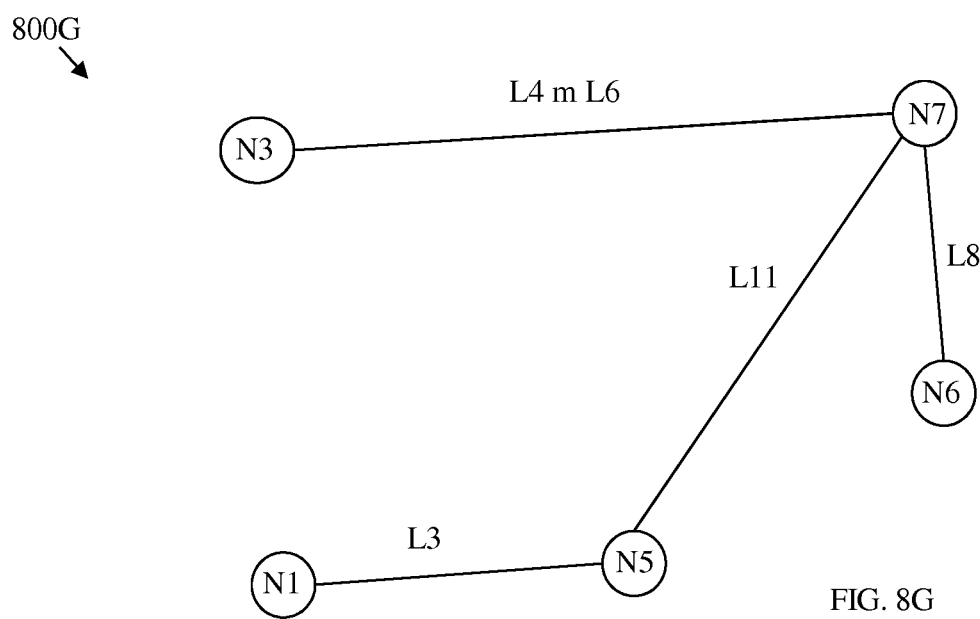

FIGS. 8B-8G are schematic diagrams of example abstract graphs of the network depicted in FIG. 8A. For example, FIGS. 8B, 8D and 8F may illustrate MSTI graphs 800B, 800D, and 800F, respectively, of network 800. FIGS. 8C, 8E, and 8G, may illustrate reduced and/or abstracted graphs 800C, 800E, and 800G, respectively, of MSTI graphs 800B, 800D, and 800F, respectively. For example, an application stratum component, such as ACG 232, may request an NCG return abstracted graphs showing communication paths between nodes N1, N3, N5, N6, and N7. Graph 800B may be reduced to 800C by applying step 709. Specifically, nodes N2 and N4 of graph 800B may be degree two nodes that are not source nodes or destination nodes. As such, node N2 and associated links L1 and L2 may be replaced by abstract link L1 m L2. Likewise, node N4 and associated links L4 and L6 may be replaced by abstract link L4 m L6, which may result in graph 800C.

As another example, graph 800D may comprise a MSTI graph of network 800. Node N2 may not be a source or destination node and may be a node of degree one. As such, node N2 may be removed at step 707. Additionally, link L4 may be a high capacity link. Presuming node N4's interface with link L5 comprises a lower capacity than the interface with link L4, nodes N3 and N4 may be merged at step 711. As N3 is a source or destination node, N3 may be maintained as the merged node.

As another example, graph 800F may comprise a MSTI graph of network 800. Node N2 may not be a source or destination node and may be a node of degree one. As such, node N2 may be removed at step 707. Additionally, node N4 may not be a source node or a destination node, and may be a node of degree two. As such, node N4 as well as adjacent links L4 and L6 may be replaced by abstract link L4 m L6 at step 709, which may result in abstract graph 800G.

Figure 9A:
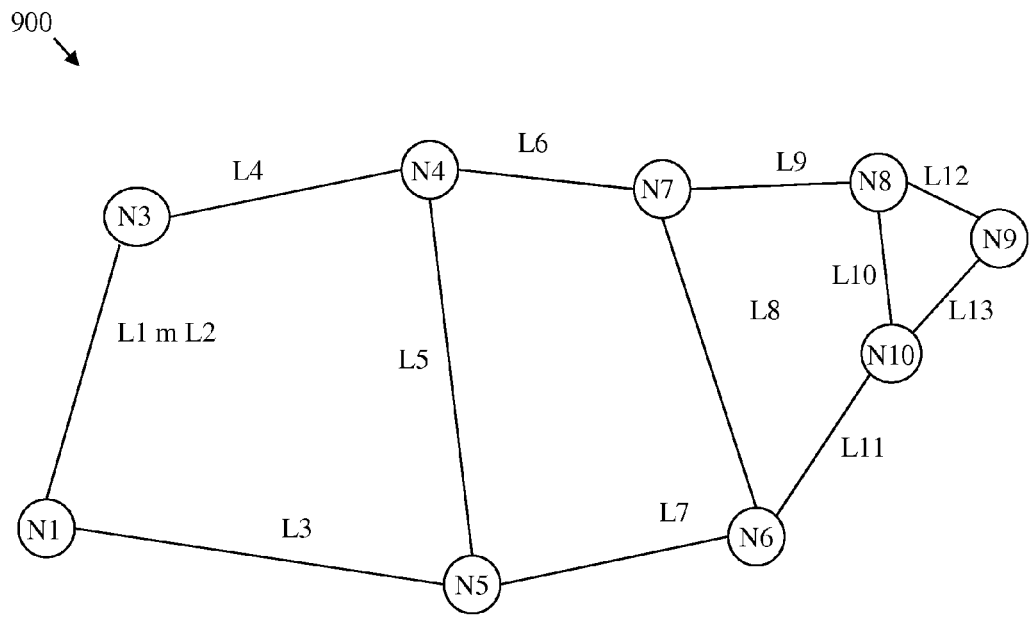
FIG. 9A is a schematic diagram of another example abstract graph.
Figure 9B:
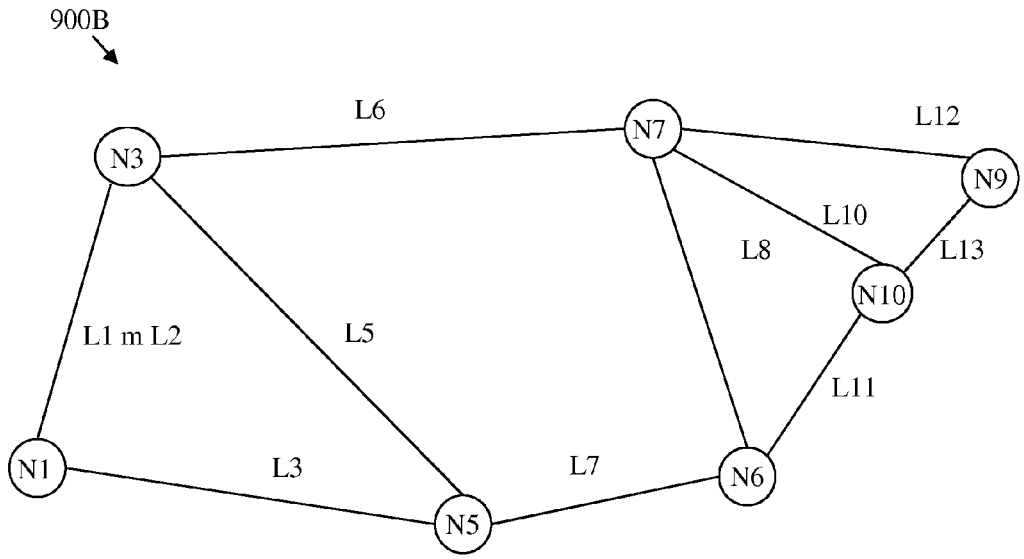
FIG. 9B is schematic diagram of an example reduction of the abstract graph depicted in FIG. 9A.

FIG. 9A is a schematic diagram of another example abstract graph 900. Graph 900 may comprise nodes N1, N3-N10, links L3-L13, and may be an abstracted version of network 400, e.g. comprising abstracted link L1 m L2 instead of link L1, link L2, and node N2. For example, a path computation request may designate source and/or destination nodes N1, N3, N5, N6, N7, N9, and N10, which may result in graph 900 after the completion of step 709. FIG. 9B is schematic diagram of an example reduction of the abstract graph depicted in FIG. 9A, for example by employing step 713. Links L4 and L9 may be high capacity links, which may comprise sufficient constraints (e.g. available bandwidth) to accept all requested constraints (e.g. requested bandwidth) requested by the application stratum. In such a case, step 713 may be employed to merge nodes N3 and N4. Additionally, node N8 may be merged with node N7. Merging nodes N3/N4 and nodes N7/N8 into abstract nodes may result in graph 900B.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network element (NE) comprising:
    a receiver configured to receive a path computation request;
    a path computation element (PCE) coupled to the receiver and configured to:
        compute a group of network paths through a network of NEs operating in a network stratum in response to the path computation request, wherein each network path traverses one or more physical links; and
        compute at least one constraint for each physical link; and
    an abstraction module coupled to the PCE and configured to:
        receive the computed network path group and constraints;
        compute one or more abstract links that describe the network path group; and
        compute a constraint for each abstract link based on the physical link constraints,
    wherein the abstract links are abstracted such that each physical link traversed by a common set of paths is abstracted into an abstract link and such that each path decision point is abstracted into an abstract node,
    wherein computing the abstract links and the constraints comprises:
        determining a path set for each physical link positioned along at least one network path, wherein each path set comprises all subsets of any of the network paths that traverse the associated physical link;
        grouping all physical links associated with an identical path set as contained link groups;
        determining a path set minimum for each contained link group, wherein the path set minimum indicates the constraint of the physical link that has a minimum constraint of the physical links in the associated contained link group;
        discarding each contained link group that is associated with a path set that is wholly included in a second contained link group's path set and comprises a path set minimum that is larger than the second contained link group's path set minimum; and
        designating each remaining contained link group as an abstract comprising a constraint equal to the contained link group's path set minimum.

2. The NE of claim 1 further comprising a transmitter coupled to the abstraction module and configured to transmit a response to the path computation request, wherein the response comprises the abstract links and at least one of the abstract link constraints.

3. The NE of claim 2, wherein the response is transmitted toward an application control gateway operating in an application stratum and not in the network stratum.

4. The NE of claim 3, wherein the path computation request is received from the application control gateway.

5. The NE of claim 4, wherein the request is received via an application layer traffic optimization (ALTO) protocol, and wherein the response is transmitted via the ALTO protocol.

6. The NE of claim 4 further comprising a virtual control management component coupled to the transmitter and configured to manage communications with the application control gateway, and wherein the NE is configured to operate in the network stratum and not the application stratum.

7. A method comprising:
    receiving data indicating one or more paths that traverse a network between a starting node and an ending node via one or more physical links;
    receiving data indicating a capacity for each physical link positioned along at least one path;
    determining a path set for each physical link positioned along at least one path, wherein each path set comprises all subsets of any of the paths that traverse the associated physical link;
    grouping all physical links associated with an identical path set as contained link groups;
    determining a path set minimum for each contained link group, wherein the path set minimum indicates the capacity of the physical link that has a minimum capacity of the physical links in the associated contained link group;
    discarding each contained link group that is associated with a path set that is wholly included in a second contained link group's path set and comprises a path set minimum that is larger than the second contained link group's path set minimum; and designating each remaining contained link group as an abstract link comprising a capacity equal to the contained link group's path set minimum, wherein the abstract links are abstracted such that each physical link traversed by a common set of paths is abstracted into an abstract link and such that each path decision point is abstracted into an abstract node.

8. The method of claim 7, wherein capacity is a measure of network bandwidth across a physical link.

9. The method of claim 7 further comprising transmitting the abstract links and associated capacities to a first network element (NE) operating in an application stratum and not operating in a network stratum.

10. The method of claim 9, wherein the abstract links and associated capacities are transmitted from a second NE operating in the network stratum and not operating in the application stratum.

11. The method of claim 10, wherein the method is performed by an abstraction module positioned in the second NE, performed by a path computation element (PCE) positioned in the second NE, or combinations thereof.

12. An apparatus comprising:
a receiver configured to receive a path computation request, wherein the path computation request comprises one or more physical link constraints; and
a processor coupled to the receiver and configured to:
compute a plurality of candidate network paths through a network of physical links and physical nodes based on the physical link constraints, wherein the physical links and physical nodes operate in a network stratum; and
derive an abstract graph of the network that retains only the physical nodes and the physical links employed by the candidate network paths by:
computing abstract links that describe the plurality of candidate network paths; and
computing an abstract constraint for each abstract link based on the physical link constraints,
wherein computing the abstract links and the abstract constraints comprises:
determining a path set for each physical link positioned along at least one candidate network path, wherein each path set comprises all subsets of any of the candidate network paths that traverse the associated physical link;
grouping all physical links associated with an identical path set as contained link groups;
determining a path set minimum for each contained link group, wherein the path set minimum indicates the abstract constraint of the physical link that has a minimum physical constraint of the physical links in the associated contained link group;

discarding each contained link group that is associated with a path set that is wholly included in a second contained link group's path set and comprises a path set minimum that is larger than the second contained link group's path set minimum; and designating each remaining contained link group as an abstract link comprising an abstract constraint equal to the contained link group's path set minimum.

13. The apparatus of claim 12, wherein the path computation request is received from a network element (NE) configured to operate in an application stratum and not in the network stratum, and wherein the apparatus further comprises a transmitter coupled to the processor and configured to transmit the abstract graph to the NE in response to the path computation request.

14. The apparatus of claim 12, wherein the physical constraint comprises lowest latency, lowest cost, highest reliability, highest bandwidth, or combinations thereof.

15. The apparatus of claim 12, wherein the candidate network paths each comprise a source and a destination, and wherein the processor is further configured to reduce the abstract graph by removing from the graph each node of degree one that is not a path source or a path destination.

16. The apparatus of claim 12, wherein the candidate network paths each comprise a source and a destination, wherein the processor is further configured to reduce the abstract graph by replacing each node of degree two and directly connected candidate path links with an abstract link, and wherein the abstract link comprises an abstract constraint equal to a sum of physical constraints of the replaced candidate path links and a physical constraint of the replaced degree two node.

17. The apparatus of claim 12, wherein each graph node comprises at least one interface, and wherein the processor is further configured to reduce the abstract graph by merging nodes incident to a candidate path link and removing the candidate path link from the abstract graph when a sum of all physical constraints of each node interface not connected to the candidate path link is less than a physical constraint of the candidate path link.

18. The apparatus of claim 17, wherein the processor is further configured to reduce the abstract graph by reducing a sub-graph of a sub-network by repeatedly merging nodes based on candidate path link constraints.

19. The apparatus of claim 12, wherein the physical constraints are associated with the candidate network paths, wherein each candidate path link is associated with an available constraint, and wherein the processor is further configured to reduce the abstract graph by merging nodes incident to a candidate path link and removing the candidate path link from the graph when a sum of all physical constraints associated with candidate paths traversing the candidate path link is less than the available constraint of the candidate path link.

* * * * *

UNITED STATES PATENT AND TRADEMARK OFFICE
CERTIFICATE OF CORRECTION

PATENT NO. : 9,270,597 B2
APPLICATION NO. : 13/937942
DATED : February 23, 2016
INVENTOR(S) : Greg Bernstein and Young Lee It is certified that error appears in the above-identified patent and that said Letters Patent is hereby corrected as shown below:

In the Claims

Column 15, Lines 53-67 through Column 16, Lines 1-29, Claim 1 should read:
1. A network element (NE) comprising:
a receiver configured to receive a path computation request;
a path computation element (PCE) coupled to the receiver and configured to:
    compute a group of network paths through a network of NEs operating in a network stratum in response to the path computation request, wherein each network path traverses one or more physical links; and
    compute at least one constraint for each physical link; and
an abstraction module coupled to the PCE and configured to:
    receive the computed network path group and constraints;
    compute one or more abstract links that describe the network path group; and
    compute a constraint for each abstract link based on the physical link constraints,
wherein the abstract links are abstracted such that each physical link traversed by a common set of paths is abstracted into an abstract link and such that each path decision point is abstracted into an abstract node, wherein computing the abstract links and the constraints comprises:
    determining a path set for each physical link positioned along at least one network path, wherein each path set comprises all subsets of any of the network paths that traverse the associated physical link;
    grouping all physical links associated with an identical path set as contained link groups;
    determining a path set minimum for each contained link group, wherein the path set minimum indicates the constraint of the physical link that has a minimum constraint of the physical links in the associated contained link group;
    discarding each contained link group that is associated with a path set that is wholly included in a second contained link group's path set and comprises a path set minimum that is larger than the second contained link group's path set minimum; and
    designating each remaining contained link group as an abstract link comprising a constraint equal to the contained link group's path set minimum.

Signed and Sealed this
Thirteenth Day of March, 2018

Andrei Iancu
*Director of the United States Patent and Trademark Office*